Figure 4:
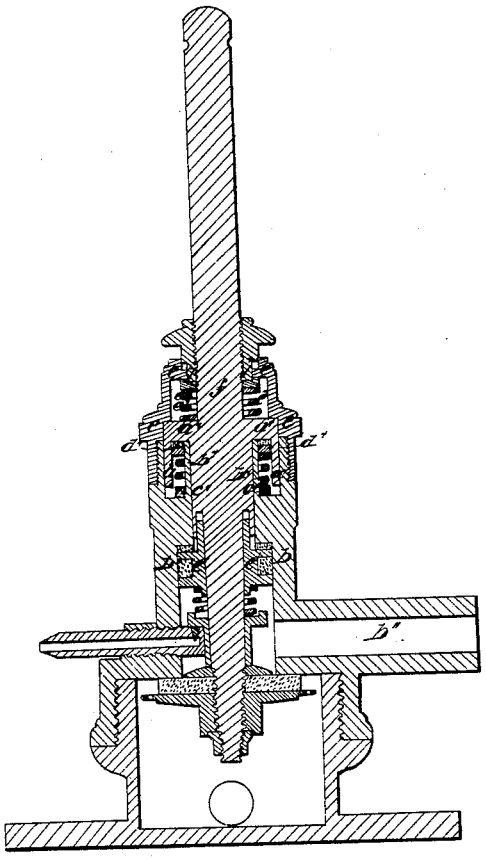

NO PRINTED SPECIFICATION AVAILABLE.
R. K. Colvin,
Sheet 1-2 Sheets.
Hydrant,
No 72,
A.I. Patented Jan. 16, 1845
Fig. 1.
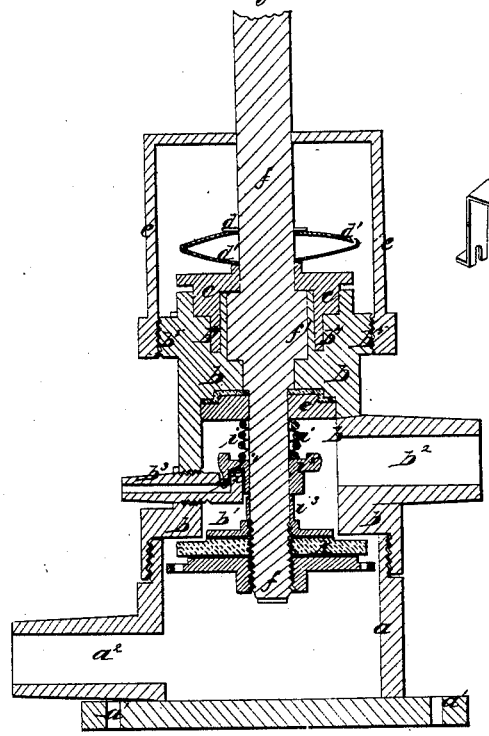
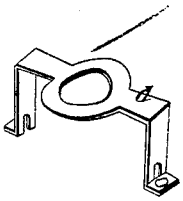
Fig. 2.
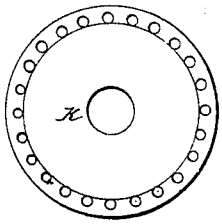
Note lost motion + spring
H. PETERS, PHOTO-LITHOGRAPHER, WASHINGTON, D. C.

NO QUALITY SPECIFICATION AVAILABLE

Sheet 2 - 2 Sheets.

R. K. Colvin,

Hydrant,

No 72,

A. I. Patented Jan. 16, 1845

N. PETERS, PHOTO-LITHOGRAPHER, WASHINGTON, D. C.